US007896307B2

(12) United States Patent
Berg

(10) Patent No.: US 7,896,307 B2
(45) Date of Patent: Mar. 1, 2011

(54) METHOD OF AND SYSTEM FOR STANCHION-BASED ADVERTISING

(76) Inventor: Michael Berg, McKinney, TX (US)

(*) Notice: Subject to any disclaimer, the term of this patent is extended or adjusted under 35 U.S.C. 154(b) by 690 days.

(21) Appl. No.: 11/661,614

(22) PCT Filed: Aug. 29, 2005

(86) PCT No.: PCT/US2005/030697

§ 371 (c)(1),
(2), (4) Date: Feb. 1, 2008

(87) PCT Pub. No.: WO2006/026560

PCT Pub. Date: Mar. 9, 2006

(65) Prior Publication Data

US 2008/0263925 A1 Oct. 30, 2008

Related U.S. Application Data

(60) Provisional application No. 60/605,459, filed on Aug. 30, 2004.

(51) Int. Cl.
*F16M 13/00* (2006.01)

(52) U.S. Cl. .................................. 248/519; 248/346.01

(58) Field of Classification Search ................. 248/519, 248/523, 511, 346.01, 346.03, 507, 910; 40/607.1; 47/32.4, 32.5, 32.6, 42, 43; 135/16
See application file for complete search history.

(56) References Cited

U.S. PATENT DOCUMENTS

| | | | | |
|---|---|---|---|---|
| 1,130,545 | A * | 3/1915 | Scott | 47/58.1 R |
| 3,415,475 | A * | 12/1968 | Goodman | 248/158 |
| 4,145,044 | A | 3/1979 | Wilson et al. | |
| 4,712,329 | A * | 12/1987 | Anderson et al. | 47/84 |
| 4,718,624 | A * | 1/1988 | Greulich | 248/158 |
| 4,948,038 | A * | 8/1990 | Moeller | 229/146 |
| 5,709,312 | A * | 1/1998 | Lake | 220/287 |
| 6,349,500 | B1 | 2/2002 | Popham | |
| D485,743 | S * | 1/2004 | Wilson, Sr. | D8/354 |
| 6,869,058 | B2 * | 3/2005 | Tung | 248/519 |
| 7,797,880 | B1 * | 9/2010 | Kamau | 47/66.6 |

OTHER PUBLICATIONS

International Preliminary Report on Patentability for PCT/US05/30697, mailed Jul. 2, 2007, 4 pages.

* cited by examiner

*Primary Examiner*—A. Joseph Wujciak, III
(74) *Attorney, Agent, or Firm*—Winstead PC

(57) ABSTRACT

A system comprising a stanchion, the stanchion including a pole and a base supporting the pole. A cover adapted to display visible indicia, the cover defining an opening and a discontinuity extending from an exterior boundary of the cover to an interior boundary of the cover, the interior boundary bounding the opening. The discontinuity permits the pole to be positioned within the opening.

18 Claims, 2 Drawing Sheets

METHOD OF AND SYSTEM FOR STANCHION-BASED ADVERTISING

CROSS-REFERENCE TO RELATED APPLICATIONS

This patent application claims priority from, and incorporates by reference the entire disclosure of, U.S. patent application Ser. No. 60/605,459, filed on Aug. 30, 2004.

BACKGROUND OF THE INVENTION

1. Technical Field

The present invention relates generally to advertising associated with stanchions used for crowd control. More particularly, but not by way of limitation, the present invention relates to a cover adapted to be placed over a stanchion base and containing advertising or other indicia.

2. History of Related Art

In an increasingly-busy society, it has become more and more necessary for public places such as banks, airports, stores, and movie theaters to control a flow of people in order to maintain an orderly environment. For example, in banks there are often a large number of customers awaiting service, making it necessary to maintain a single line or series of lines of customers so as to permit servicing of the customers in an orderly fashion, as well as in the appropriate order. Similar situations include travelers at airports waiting to see an airline representative. However, it is often difficult, if not impossible, to maintain an orderly line of people without using physical barriers to maintain the people in a desired line or lines.

Stanchions are typically used at public places such as banks, airports, stores, and movie theaters to control a flow of people in order to maintain an orderly environment. Organizations around the world have tried to advertise to customers waiting in confined spaces. Advertisements may include signage that may incorporate information relating to addresses, party identification, directions, product information, etc. Advertising in such areas has been traditionally limited to printing on belts stretched between the stanchions. The belts on which the advertisements are printed are often expensive to print and difficult to replace. Therefore, there is a need for an improved means for advertising on stanchions that is easy, efficient, and affordable.

SUMMARY OF THE INVENTION

A system comprising a stanchion, the stanchion including a pole and a base supporting the pole. A cover adapted to display visible indicia, the cover defining an opening and a discontinuity extending from an exterior boundary of the cover to an interior boundary of the cover, the interior boundary bounding the opening. The discontinuity permits the pole to be positioned within the opening.

A method of advertising includes displaying visible indicia on a cover adapted to be positioned on top of a base of a stanchion. The cover defines an opening and a discontinuity extending from an exterior boundary of the cover to an interior boundary of the cover, the interior boundary bounding the opening and wherein the discontinuity permits a pole of the stanchion to be placed within the opening.

A cover adapted to be placed over a base of a stanchion, the cover including an exterior boundary, an interior boundary, and a first edge and a second edge together defining a discontinuity extending from the exterior boundary of the cover to the interior boundary of the cover, the interior boundary bounding an opening. The discontinuity permits a pole of the stanchion to be positioned within the opening and wherein the cover is adapted to display visible indicia.

A system comprising a stanchion, the stanchion including a pole and a base supporting the pole, a cover adapted to display visible indicia, the cover defining an opening, a first discontinuity, and a second discontinuity. The first discontinuity and second discontinuity extend from an exterior boundary of the cover to an interior boundary of the cover, the interior boundary bounding the opening and wherein the first discontinuity and the second discontinuity permit the pole to be positioned within the opening.

BRIEF DESCRIPTION OF THE DRAWINGS

A more complete understanding of the present invention may be obtained by reference to the following Detailed Description of Illustrative Embodiments of the Invention, when taken in conjunction with the accompanying Drawings, wherein.

DETAILED DESCRIPTION OF ILLUSTRATIVE EMBODIMENTS OF THE INVENTION

Embodiment(s) of the invention will now be described more fully with reference to the accompanying Drawings. The invention may, however, be embodied in many different forms and should not be construed as limited to the embodiment(s) set forth herein. The invention should only be considered limited by the claims as they now exist and the equivalents thereof.

Figure 1:
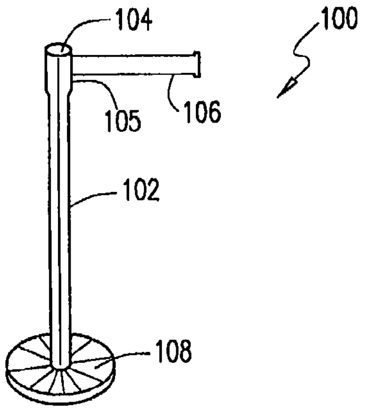
FIG. 1 is a side view of a stanchion having a circular base.

Referring now to FIG. 1, a stanchion 100 is illustrated. The stanchion 100 includes a supporting pole 102, a headpiece 104, and a horizontal base 108. The headpiece 104 illustrated is a generally cylindrical fixture that can be mounted on or integrally formed with the stanchion 100. Those having skill in the art will recognize that the particular shape or design of the base 108, the supporting pole 102, and the headpiece 104 are not critical to the present invention.

The headpiece 104 can be formed of any suitable material having the required structural and dimensional stability. The headpiece 104 is typically formed of a metal such as, for example, brass, chrome, steel, or aluminum, which can be painted or coated with other materials. In addition, the headpiece 104 can be formed of wood or a dimensionally-stable plastic such as, for example, high-density polyethylene.

The headpiece 104 is adapted for engagement with a first end portion 105 of flexible material 106. The flexible material 106 generally includes an elongated length of nylon or polypropylene webbing material, although other flexible materials, including velvet, leather, rubber or rubberized materials, plastics, and other synthetic and natural materials may also be suitable for use as the flexible material 106. The headpiece 104 is attached to the supporting pole 102, which in turn is connected to the horizontal base 108. The horizontal base 108 as illustrated has a generally circular shape; however, the base 108 can be any shape that provides stability to the stanchion 100 when in an upright position (e.g., square, rectangular, cone, triangle, hexagon, octagon, etc).

Figure 2A:
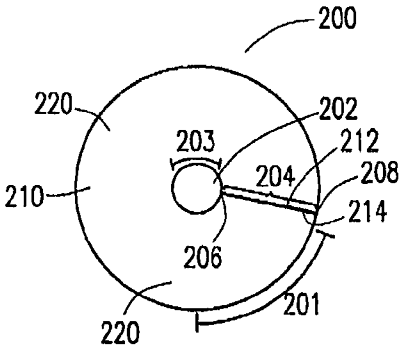
FIG. 2A is a top view of a flexible cover.

FIG. 2A illustrates a flexible cover 200 having a generally circular shape. As used herein, the term "cover" refers to any device for covering all or part of the base 108 of the stanchion 100 such as, for example, a coaster, a washer, a disk, etc. As used herein, the terms "coaster", "washer", and "disk" all refer to a mat to be placed over the base 108 for covering all or part of the base 108. The flexible cover 200 includes an exterior boundary 201 and an interior boundary 203 forming an opening 202 towards the center of the flexible cover 200, the opening 202 being sized and shaped to accommodate the supporting pole 102 of the stanchion 100. The opening 202 is bounded by the interior boundary 203.

The flexible cover 200 is shaped so that it covers at least a portion of the base 108 of the stanchion 100. The flexible cover 200 further includes a discontinuity 204 from a point 208 of the exterior boundary 201 to a point 206 of the interior boundary 203. For example, the discontinuity 204 may be a slit. As used herein, the term "slit" refers to a long narrow opening from a point 208 of the exterior boundary 201 to a point 206 of the interior boundary 203. A top surface 220 of the flexible cover 200 may include advertising, graphics, or other indicia. The flexible cover 200 may be of virtually any shape. The discontinuity 204 creates a first edge 212 and a second edge 214.

The flexible cover 200 can be formed of any suitable material having the required durability. The flexible cover 200 is typically formed of one or more of a variety of materials such as, for example, paper, cardboard, plastic, vinyl, rubber, ceramic, or any other material on which advertising, graphics, or other indicia can be placed. The flexible cover 200 may include magnetic strips attached to an underside (not shown) of the flexible cover 200 for adhering the flexible cover 200 to the base 108.

Figure 2C:
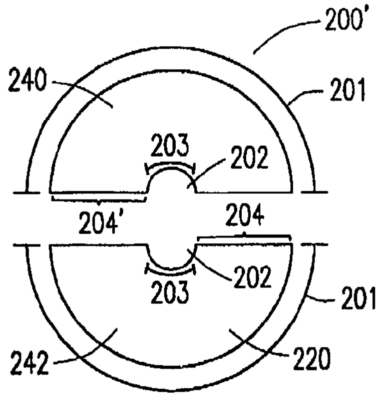
FIG. 2C is a top view of the cover of FIG. 2B illustrating a first and a second portion thereof.
Figure 2B:
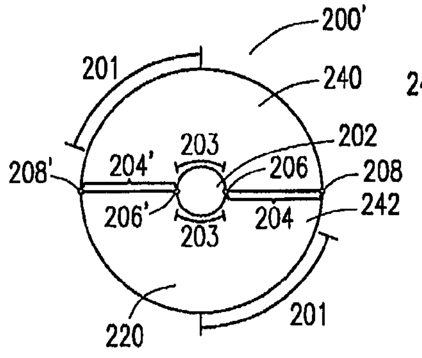
FIG. 2B is a top view of a cover according to another embodiment.

FIG. 2B illustrates a cover 200' having a generally circular shape. The cover 200' includes an exterior boundary 201 and an interior boundary 203 forming an opening 202 towards the center of the cover 200', the opening 202 being sized and shaped to accommodate the supporting pole 102 of the stanchion 100. The opening 202 is bounded by the interior boundary 203.

The cover 200' is shaped so that it covers at least a portion of the base 108 of the stanchion 100. The cover 200' includes a first discontinuity 204 and a second discontinuity 204', proceeding respectively from a point 208 and a point 208' of the exterior boundary 201 to a point 206 and a point 206' of the interior boundary 203. For example, the discontinuities 204 and 204' may be a slit. As used herein, the term "slit" refers to a long narrow opening from a point 208, 208' of the exterior boundary 201 to a point 206, 206' of the interior boundary 203. The plurality of discontinuities 204 and 204' create a first portion 240 and a second portion 242 of the cover 200' as shown in FIG. 2C. The plurality of portions 240 and 242 of the cover 200' are adapted to be placed over the base 108 of the stanchion 100 and to be joined using, for example, adhesive tape, hook-and-loop fastener, a magnet, staples, or the like. A top surface 220 of the of the cover 200' may include advertising, graphics, or other indicia.

Figure 3:
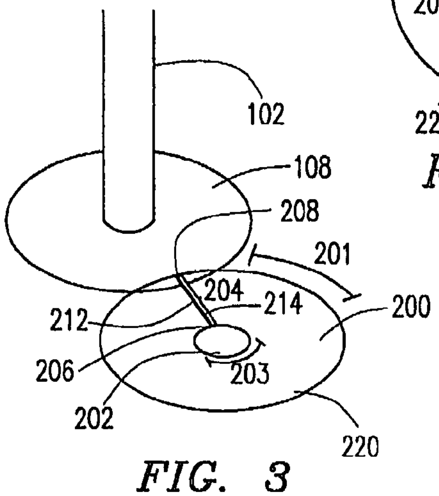
FIG. 3 is a perspective view of the stanchion and the flexible cover.
Figure 4:
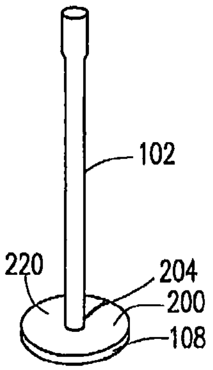
FIG. 4 is a perspective view in which the flexible cover is placed over a base of the stanchion.

To further facilitate an understanding of the flexible cover 200, its assembly onto the base 108 of the stanchion 100 and use of the flexible cover 200 will be described in connection with FIGS. 3-4. FIG. 3 illustrates the flexible cover 200 just prior to being placed on top of the base 108. The discontinuity 204 facilitates placement of the flexible cover 200 on the base 108 and around the supporting pole 102. After the flexible cover 200 has been placed on the base 108, a first edge 212 and a second edge 214 formed due to the discontinuity 204 may be joined using, for example, adhesive tape, a hook-and-loop fastener, a magnet, staples or the like. The top surface 220 of the circular flexible cover 200 may include advertising, graphics, or other indicia. FIG. 4 illustrates the flexible cover 200 placed over the base 108 of the stanchion 100.

Figure 5:
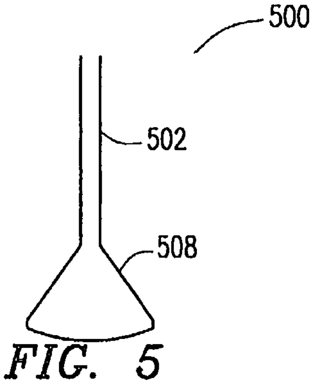
FIG. 5 is a side view of a stanchion having a cone shaped base.

FIG. 5 illustrates a portion of a stanchion 500. The stanchion 500 includes a supporting pole 502 and a base 508. In this example, the base 508 is generally cone-shaped; however, the base 508 can be any shape that provides stability to the stanchion 500 in an upright position (e.g., square, rectangular, triangle, hexagon, octagon, etc).

Figure 6A:
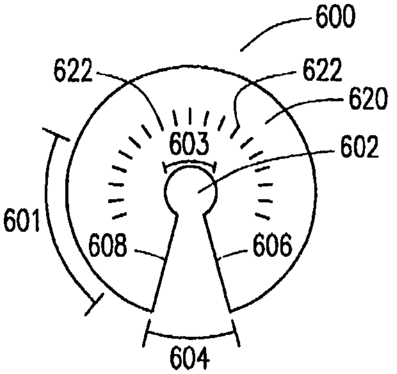
FIG. 6A is a top view of a flexible cover according to an alternate embodiment.

FIG. 6A illustrates a flexible cover 600 having a generally circular shape. The flexible cover 600 includes an exterior boundary 601 and an interior boundary 603 forming an opening 602 towards the center of the flexible cover 600, the opening 602 being sized and shaped to accommodate the supporting pole 502 of the stanchion 500. The opening 602 is bounded by the interior boundary 603. The flexible cover 600 further includes a discontinuity 604. For example, the discontinuity 604 may be a cutout portion within the flexible cover 600 creating a gap. The cutout portion within the flexible cover 600 is bounded by a first edge 606 and a second edge 608. The cutout portion allows the flexible cover 600 to be placed over the cone shaped base structure 508. Once the flexible cover 600 is placed over the cone shaped base structure 508, the first and second edges 606 and 608 are pulled together such that the first and second edges 606 and 608 are in contact with one another, causing the flexible cover 600 to take on a cone-shape to mate with, for example, the cone-shaped base 508. After the flexible cover 600 is placed on the cone-shaped base structure 608, the first and second edges 606 and 608 may be joined using, for example, an adhesive tape, a hook-and-loop fastener, a magnet, staples, or the like. The first and second edges 606 and 608 may also overlap an area adjacent to the first edge 606 and an area adjacent to the second edge 608 relative to one another. The flexible cover 600 includes indicators 622 on a top surface 620 of the circular flexible cover 620 for performing the overlapping function. The indicators 622 may be positioned so as to allow a suitable fit of the cover 600 onto a particular stanchion design by selection of the appropriate indicator 622. The top surface 620 of the circular flexible cover 600 may include advertising, graphics, or other indicia.

The flexible cover 600 may be of any shape desired to cover all or part of a corresponding base (e.g., the base 508). The flexible cover 600 can be formed of any suitable material having the required durability. The flexible cover 600 may typically be formed of a variety of materials such as, for example, paper, cardboard, plastic, vinyl, rubber, ceramic, or any other material on which advertising, graphics, or other indicia can be easily placed.

Figure 7:
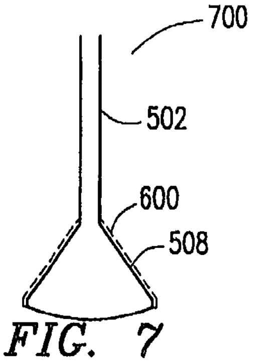
FIG. 7 is a side view in which the flexible cover is placed over a cone shaped base of the stanchion.
Figure 6B:
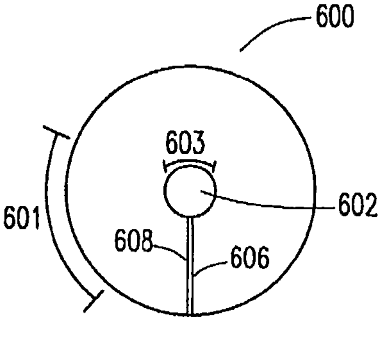
FIG. 6B a top view of the flexible cover according to an alternate embodiment.
Figure 6C:
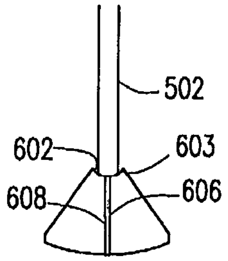
FIG. 6C is side view in which the flexible cover is placed over a base of the stanchion.

FIG. 6B illustrates a top view of the flexible cover 600 in which the first and second edges 606 and 608 are in contact with one another. The contact between the first edge 606 and the second edge 608 causes the flexible cover 600 to take on a cone shape. FIG. 6C illustrates a edge view the flexible cover 600 placed over the base 508 (not shown) of the stanchion 500. The contact between the first edge 606 and the second edge 608 causes the flexible cover 600 to take on a cone shape to mate with, for example, the cone-shaped base 508 (not shown). FIG. 7 illustrates the cover 600 placed over the base 508 of the stanchion 500. The cover 600 is indicated by dashed lines.

Figure 8:
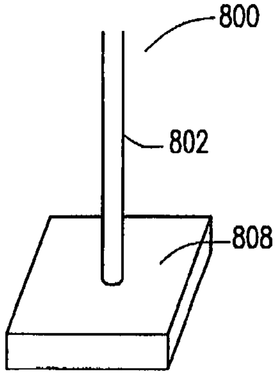
FIG. 8 is a side view of a stanchion having a square base.
Figure 9:
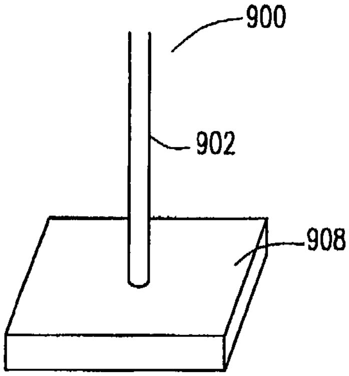
FIG. 9 is a view of a stanchion having a rectangular base.

FIG. 8 illustrates a portion of a stanchion 800. The stanchion 800 includes a supporting pole 802 and a base 808. hi this example, the base 808 is generally square-shaped. FIG. 9 illustrates a portion of a stanchion 900. The stanchion 900 includes a supporting pole 902 and abase 908. hi this example, the base 908 is generally rectangular-shaped. The base structure can be any geometric shape that provides stability to the stanchion in an upright position (e.g., square, rectangular, circle, triangle, hexagon, octagon, etc).

Figure 10:
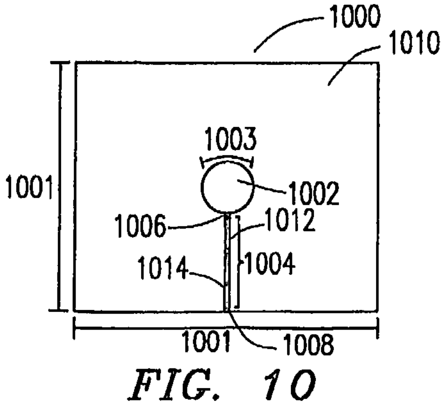
FIG. 10 is a top view of a flexible cover having a square shape.

FIG. 10 illustrates a flexible cover 1000 having a generally square shape. The flexible cover 1000 includes an exterior boundary 1001 and an interior boundary 1003 forming an opening 1002 towards the center of the flexible cover 1000, the opening 1002 being sized and shaped to accommodate the supporting pole (not shown). The opening 1002 is bounded by the interior boundary 1003.

The flexible cover 1000 further includes a discontinuity 1004 from a point 1008 of the exterior boundary 1001 to a point 1006 of the interior boundary 1003. For example, the discontinuity 1004 may be a slit. A top surface 1010 of the flexible cover 1000 may include advertising, graphics, or other indicia. The flexible cover 200 may be of any shape. The discontinuity 1004 creates a first edge 1012 and a second edge 1014. The discontinuity 1004 facilitates placement of the flexible cover 1000 on a base structure of a stanchion (not shown). After the flexible cover 1000 is placed on the base structure (not shown), the first edge 1012 and the second edge 1014 may be joined using, for example, an adhesive tape, a hook-and-loop fastener, a magnet, staples, or the like.

The flexible cover 1000 can be formed of any suitable material having the required durability. The flexible cover 200 is typically formed of one or more of a variety of materials such as, for example, paper, cardboard, plastic, vinyl, rubber, ceramic, or any other material on which advertising, graphics, or other indicia can be placed. The flexible cover 1000 may include magnetic strips attached to an underedge (not shown) of the flexible cover 1000 for adhering the flexible cover 1000 to the base (not shown).

The previous Detailed Description is of embodiment(s) of the invention. The scope of the invention should not necessarily be limited by this Description. The scope of the invention is instead defined by the following claims and the equivalents thereof.

What is claimed is:

1. A system comprising:

a stanchion, the stanchion comprising:

a pole; and a base supporting the pole, the base having a cone shaped configuration;

a cover adapted to display visible indicia, the cover defining an opening and a discontinuity extending from an exterior boundary of the cover to an interior boundary of the cover, the interior boundary bounding the opening;

wherein the discontinuity comprises a gap and permits the pole to be positioned within the opening;

wherein the gap is bounded by a first edge and a second edge of the cover; and responsive to contacting the first and the second edges against one another, the cover surrounds the pole and is operable to cover at least part of the cone shaped base.

2. The system of claim 1, wherein the visible indicia comprise advertising.

3. The system of claim 2, wherein the visible indicia comprise graphics.

4. The system of claim 1, wherein the cover is made from a material selected from the group consisting of paper, cardboard, plastic, vinyl, rubber, and ceramic.

5. The system of claim 1, wherein the cover has a shape of circle.

6. The system of claim 1, wherein the cover is adapted to cover at least part of the base.

7. The system of claim 1, wherein the discontinuity is bounded by a first edge and a second edge of the cover; and wherein the first and second edges are joined using at least one of adhesive tape, a hook-and-loop fastener, a magnet, and staples.

8. The system of claim 1, wherein the first and second edges are joined using at least one of adhesive tape, a hook-and-loop fastener, a magnet, and staples.

9. The system of claim 1, wherein the cover has magnetic strips attached to an underside of the cover for attaching the cover to the base.

10. A system comprising:

a stanchion, the stanchion comprising:

a pole; and a base supporting the pole, the base having a cone shaped configuration;

a cover adapted to display visible indicia, the cover defining an opening and a discontinuity extending from an exterior boundary of the cover to an interior boundary of the cover, the interior boundary bounding the opening;

wherein the discontinuity comprises a gap and permits the pole to be positioned within the opening;

wherein the gap is bounded by a first edge and a second edge of the cover; and responsive to overlapping an area adjacent to the first edge and an area adjacent to the second edge relative to one another, the cover surrounds the pole and is operable to cover at least part of the cone shaped base.

11. The system of claim 10, wherein the visible indicia comprise advertising.

12. The system of claim 11, wherein the visible indicia comprise graphics.

13. The system of claim 10, wherein the cover is made from a material selected from the group consisting of paper, cardboard, plastic, vinyl, rubber, and ceramic.

14. The system of claim 10, wherein the cover has a shape selected from the group wherein the cover has a shape of circle.

15. The system of claim 10, wherein the cover is adapted to cover at least part of the base.

16. The system of claim 10, wherein the discontinuity is bounded by a first edge and a second edge of the cover; and wherein the first and second edges are joined using at least one of adhesive tape, a hook-and-loop fastener, a magnet, and staples.

17. The system of claim 10, wherein the first and second edges are joined using at least one of adhesive tape, a hook-and-loop fastener, a magnet, and staples.

18. The system of claim 10, wherein the cover has magnetic strips attached to an underside of the cover for attaching the cover to the base.

* * * * *

UNITED STATES PATENT AND TRADEMARK OFFICE

CERTIFICATE OF CORRECTION

PATENT NO. : 7,896,307 B2
APPLICATION NO. : 11/661614
DATED : March 1, 2011
INVENTOR(S) : Berg It is certified that error appears in the above-identified patent and that said Letters Patent is hereby corrected as shown below:

In the Specification

Column 5, Line 16

Replace "abase"
With -- a base --

Signed and Sealed this
Twenty-sixth Day of November, 2013

Margaret A. Focarino
*Commissioner for Patents of the United States Patent and Trademark Office*